Jan. 28, 1958 R. V. JUDY 2,821,573

DUAL-SWITCH FINDER COMBINATION

Filed July 24, 1953 2 Sheets-Sheet 1

United States Patent Office 2,821,573

Patented Jan. 28, 1958

2,821,573

DUAL-SWITCH FINDER COMBINATION

Robert V. Judy, Chicago, Ill., assignor to International Telephone and Telegraph Corporation, a corporation of Maryland Application July 24, 1953, Serial No. 370,114

4 Claims. (Cl. 179—18)

This invention relates to a dual-switch finder combination for use in, for example, a telephone switching system. Its principal object is to provide a combination of two mechanical independent progressively movable automatic switches, together with suitable control arrangements for insuring that both switches assume the same desired one of a number of connecting positions in which they cooperate to close more conductors than either can close alone.

GENERAL DESCRIPTION

In telephone and related switching systems, occasions arise requiring that a connection from one unit of apparatus to any one of a group of other units includes a relatively large number of conductors which sometimes exceeds the number of brushes obtainable on a single standard automatic switch. It is, of course, possible to provide a special switch having a larger number of brushes than any standard maximum number, such as nine, but such special switches are usually expensive, and are open to other objections, such as requiring special mounting frames, and the like. The use of two independently operable automatic switches to share the large number of conductors between them has not heretofore been considered practicable because of their tendency to get out of step and so remain, thus making respective parts of two multi-conductor connections instead of cooperating to make one such connection.

An important feature of the invention is that one of the switches is first caused to move to the desired connecting position and to mark that position in the bank of the other switch, whereupon the other switch is operated to assume its marked position, being the same position already occupied by the first switch.

A specific object of the invention is to provide simple and reliable control apparatus according to the foregoing feature.

It has been chosen to illustrate the invention as applied to a telephone system wherein key-controlled register-senders of a group are common to a number of operator positions, of a toll board for example. It is assumed that the operator at each position has position equipment common to all the cord circuits of the position, such equipment including a set of digit keys for effecting digit registration in a selected idle sender to which a multi-conductor connection has been extended from the position equipment. Some very reliable and satisfactory register senders each require that more than ten individual conductors be extended thereto from a position equipment, whereas the maximum number of brushes obtainable on standard automatic stepping switches of one well known and desirable type is less than ten. In the illustrative example, sixteen control wires (excluding the idle-test wire) are required to be extended from a position equipment to a sender. This number of wires is accommodated by using two nine-brush automatic stepping switches.

*The drawings*

In the drawings, Figs. 1 and 2 show one specific embodiment of the invention;

Fig. 1 is a single-line switching diagram showing the switching relationship existing between the position equipments and the sender equipments; and Fig. 2 is a corresponding circuit diagram showing the circuit details of the preferred form of the invention serving as a dual-switch sender finder.

*General operation*

Referring now to Fig. 1 of the drawings, it will be observed that an indefinite number of position equipments are indicated, the first, second, and last being the only ones shown. Associated with each of the position equipments are two single-motion rotary switches 1 and 2, multipled to corresponding switches of the other positions.

A group of sender equipments of which the first, second and last are shown are associated with each multiple on the switches, the number of sender equipments provided corresponding to the number of equipped contacts in the bank of any one rotary switch, as each contact point has access to a separate sender.

In their illustrated positions, the brushes associated with the switches of equipment P1 are positioned on contacts 1 of the bank, the brushes of the switches associated with equipment P2 are positioned on contacts 2, and the brushes of the last equipment PN are positioned on the contacts L of each of the switches. Upon being so positioned, the first position equipment P1 is connected to the sender equipment SE–1 over conductors in trunk T1, the second position equipment P2 is connected to the second sender equipment SE–2 over trunk T2, and the last position equipment PN is connected to the last sender equipment SE–L over conductors in trunk TL.

With such a trunking scheme, any position has access to any of the senders, there normally being fewer senders than there are positions to thereby increase the efficiency of the senders.

The connecting apparatus, termed sender finders, for connecting any position to its selected sender includes the illustrated switches 1 and 2 and the control apparatus of Fig. 2, which will be described in detail hereinafter.

The number of switches associated with each position may be greater than two, although in this specific embodiment two switches are sufficient to switch the number of control wires necessary in connecting any position to any sender.

The trunks T1, T2, and TL comprise a group of wires, shown in detail in Fig. 2, which are connected to the corresponding contact points of the banks of the various levels, the switches comprising a multiplicity of levels of which only one is shown in Fig. 1.

DETAILED DESCRIPTION

A detailed description of the invention will now be given with reference to Fig. 2 of the drawings, in which the position equipment P1 is connected to the sender equipment SE–1 through sender-finder equipment 200 which includes switches 1 and switches 2 of the associated position P1.

Figure 1:
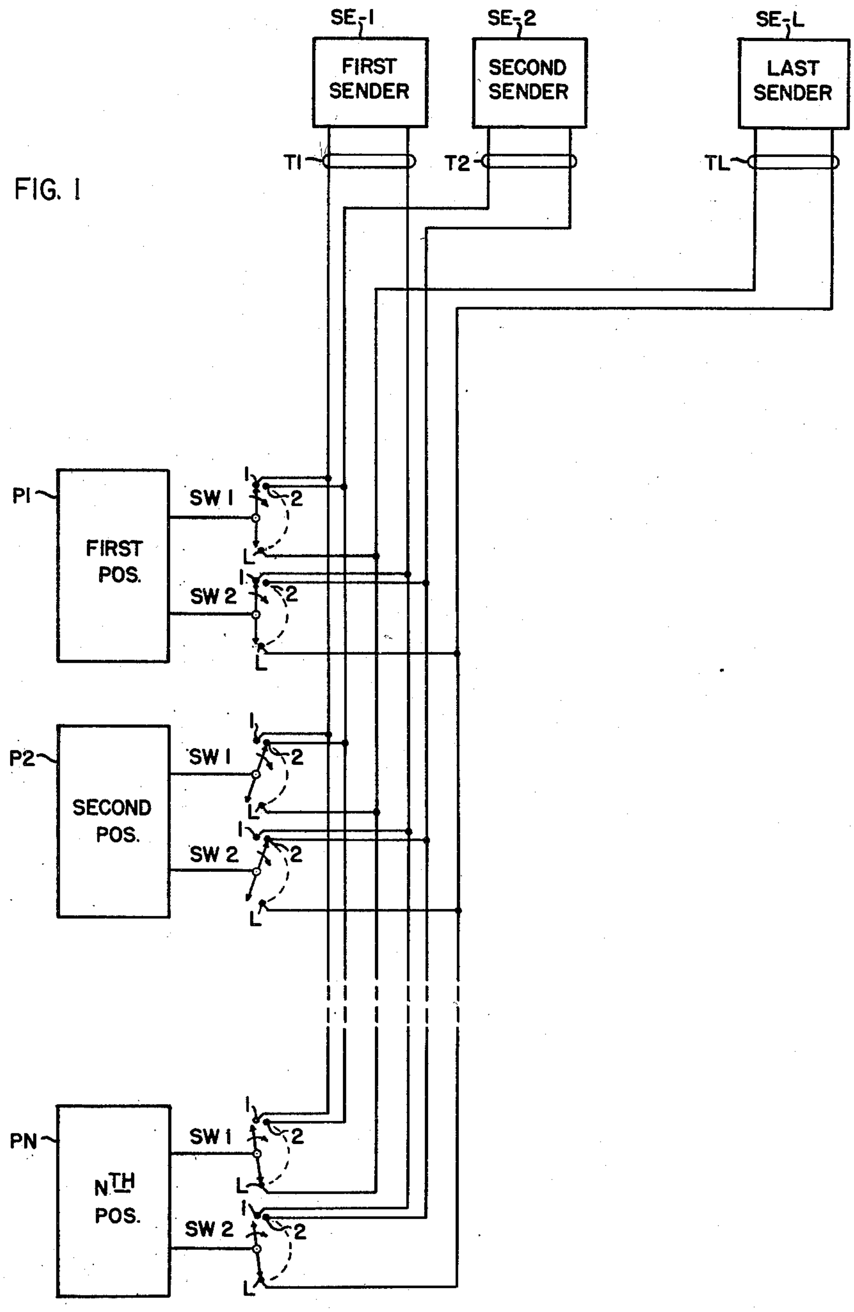
Figure 2:
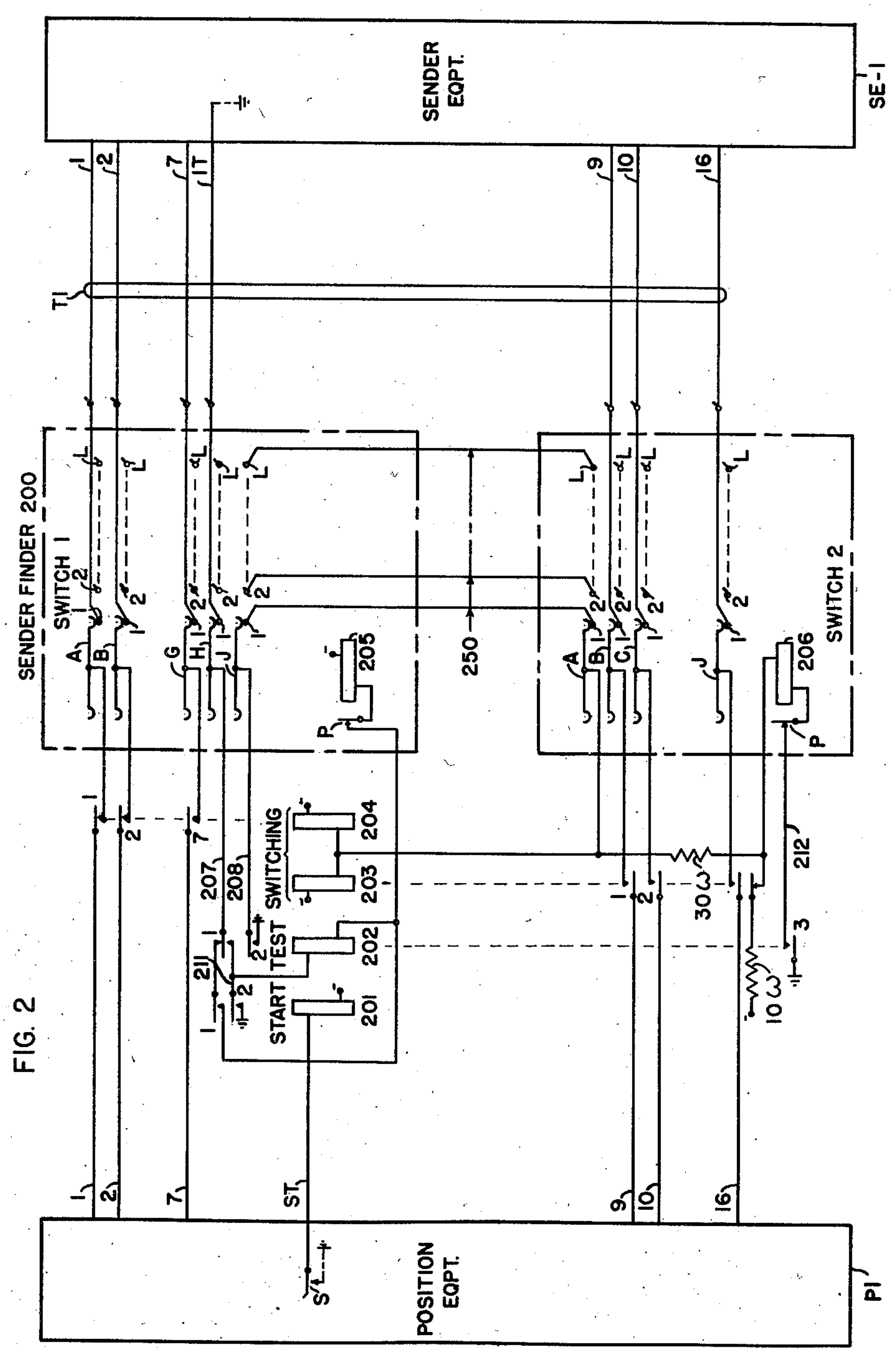

The switches shown in Figs. 1 and 2 are rotary switches similar to the rotary switch shown in Fig. 30, page 49 of Miller, vol. III, "Telephone Theory and Practice." These switches are ones in which the brushes of the stepping magnet are not advanced until the completion of the driving pulse.

As will be observed in Fig. 2, the rotary switches are each shown to comprise a stepping magnet and associated self-interrupting contacts P and levels of bank contacts 1 to L with their associated brushes A to J. It will be further observed that the contacts of the bank level associated with brush J of switch 1 and brush A of switch 2 are interconnected by jumpers 250 extending between corresponding contacts, and that the control wires 1 through 7 and 9 through 16, connected to contact 1 of each level of both switches, extend to sender equipment SE-1, with the remaining contacts 2 to L of each level extending to corresponding sender equipments over conductors in corresponding trunks. The control wires (indicated by the multiple connections) associated with contacts 2 of each level of the two switches extend to sender equipment SE-2 and such control wires associated with contacts L extend to sender equipment SE-L.

*Seizure of sender finder*

Responsive to the operation of start key S of position equipment P1, start wire ST connected to the battery-connected winding of start relay 201 is energized, starting the sender finder into operation, hunting an idle sender.

The idle test wires IT associated with the contacts of the bank level associated with brush H have ground potential appearing thereon when the associated sender equipment is busy and have battery potential or lack of ground potential thereon when such sender is idle.

For purposes of illustration, it will be assumed that the first and second sender equipments SE-1 and SE-2 (SE-2 not shown) are busy and that sender SE-3 (not shown) is idle.

Start relay 201 operates from the energized start wire ST; its make contacts 2 extends ground potential to one side of the wiring of test relay 202; and its contacts 1 connect wire 207, associated with brush H of switch 1, to the other side of the test relay 202 and to the battery-connected winding of stepping magnet 205 through pulsing contacts P of switch 1.

Sender finder 200 is now seized and starts hunting for an idle sender equipment for connection to the calling position equipment.

*Switch 1 operation*

In the illustrated position, brush H of switch 1 is associated with idle test wire IT connected to the assumed busy sender SE-1, and the busy-marking ground appearing on idle test wire IT is extended to wire 207. With ground appearing on both sides of the winding of test relay 202, relay 202 is short-circuited and cannot operate. However, the ground on wire 207 is extended to the battery-connected winding of stepping magnet 205 of switch 1.

The stepping magnet of switch 1 is energized, and upon operating opens its pulsing contacts P to open its operate circuit. Magnet 205 is consequently deenergized and causes its brushes A through J to advance from their illustrated position on contacts 1 to contacts 2. As long as ground remains on wire 207, the stepping magnet 205 will be energized and deenergized by its self-interrupting contacts P, advancing the brushes across the contact bank. Test relay 202 remains short-circuited until brush H positions itself on a contact associated with an idle sender.

Responsive to the operation and deenergization of stepping magnet 205, and the consequent advancement of brushes A through J to position 2, the control wires (not shown) of trunk T2 extending to sender equipment SE-2 are connected to sender finder 200. Under the assumption that the second sender equipment is busy, wire 207 is still grounded and stepping magnet 205 is again energized and deenergized and advances its brushes to the next position, position 3.

In position 3, assuming the associated sender equipment SE-3 to be idle, the lack of ground potential on idle test wire IT removes the short-circuit from the winding of test relay 202 and the driving potential for magnet 205 is absented. Ground potential from contacts 2 of start relay 201 now appears on one side of the test relay 202 in series with the battery-connected winding of stepping magnet 205.

Test relay 202 operates in circuit with stepping magnet 205. However, the current flow through the series circuit is such that only the test relay is operated.

Upon operating, contacts 1 of relay 202 transfer wire 207 from the battery-connected winding of stepping magnet 205 to the grounded operate wire 211 extending to test relay 202. The ground potential on wire 211 now appears on wire 207 thereby grounding idle test wire IT, rendering the associated sender (SE-3) busy to all other sender finders. Contacts 2 of test relay 202 ground conductor 208 which is associated with brush J of switch 1, and contacts 3 ground wire 212 extending to magnet 206 of switch 2.

*Switch 2 operation*

With brush J of switch 1 in position 3, the ground potential on wire 208 is extended to the corresponding contacts 3 of the bank level associated with brush A of switch 2 over a conductor 250.

Stepping magnet 206 has one side of its winding connected to battery potential through a 10 ohm resistor and contacts 9 of switching relay 203, and responsive to the grounding of wire 212, is energized. Magnet 206 operates and opens its self-interrupting contacts P, restoring itself and causing its brushes A through J to advance from contacts 1 to contacts 2. Responsive to the deenergization of stepping magnet 206, the self-interrupting contacts P are again closed and the ground on wire 212 energizes stepping magnet 206 against thereby causing its brushes to be advanced to position 3.

Upon reaching position 3, the ground from wire 208 extending to contacts 3 of the contact bank associated with brush A of switch 2 appears on wire 209 and is extended to the battery-connected winding of the switching relays 203 and 204 and to normally-ungrounded side of stepping magnet 206. This ground from wire 208 appearing on wire 209 effectively short-circuits stepping magnet 206 preventing it from advancing any further and causes switching relays 203 and 204 to operate.

With stepping magnet 206 short-circuited and relays 203 and 204 operated, contacts 1 to 8 of relay 203 and contacts 1 to 7 of relay 204 connect the control wires associated with position equipment P1 to the control wires associated with the selected sender equipment SE-3, thereby individualizing sender SE-3 with position P1. Contacts 9 of switching relay 203 open the battery-supply circuit of stepping magnet 206 to reduce the current drain caused by the grounded wire 209.

At such time, switch 1 is in position 3 and switch 2 is in its corresponding position 3 with the control wires from the postion equipment P1 being connected to the control wires of trunk T3 extending to sender equipment SE-3.

The operator at position equipment P1 transmits the required digit information to the sender equipment and may thereafter restore the start key S. With start-key S restored, relay 201 restores and at its contacts 2 removes ground from wire 208. However, with the sender SE-3 seized by the operation of relays 203 and 204, ground potential from the sender equipment is placed on the idle test wire IT and maintains test relay 202 operated in circuit with stepping magnet 205 of switch 1. Ground potential appears on one of the control wires extending between the position and sender to prevent the operator from transmitting the digit information of another call until such time the current digit information is sent by the seized sender.

Responsive to the completion of the sending operation of the selected sender equipment SE-3, ground potential is removed from the idle test wire IT. Test relay 202 restores and removes ground from wires 208 and 212. The switching relays 203 and 204 restore and switches 1 and 2 are left in their last used position in preparation for another call.

If for any reason, the operator at any position P1 desires to maintain the position equipment connected to the selected sender, the continued operation of the start key S maintains start relay 201 operated thereby holding the test relay and switching relays operated.

Responsive to the initiation of another call, switch 1 advances from its last-used position seeking the next idle sender assuming that the sender associated with its last-used position is busy. If sender equipment SE–3 is idle at the time another call is initiated while switches 1 and 2 have their brushes positioned on contact 3, or if sender SE–1 is idle when the brushes are positioned on contacts 1, the test relay and switching relays operate without any required advancement of the brushes of either switch 1 or 2.

I claim:

1. In a switching system, a group of first equipments and a group of second equipments, separate switching means for said first equipments, control means in any first equipment for operating its associated switching means to extend a multi-conductor connection from such first equipment to one of said second equipments, each said switching means including a first switch and a second switch each having positions corresponding respectively to said second equipments, said control means including means for first operating said first switch step-by-step to a position corresponding to said one second equipment, means for thereafter operating the second switch step-by-step, means for insuring that the second switch proceeds to and stops at its position corresponding to the last said second equipment, and means including the said switches in their respective last said positions for closing respective portions of the conductors of said multi-conductor connection to the last said second equipment.

2. In a switching equipment according to claim 1, wherein the said insuring means includes marking means responsive to said first switch reaching its last said position for marking the corresponding second equipment, and includes means for causing the second switch to proceed to and stop at its position corresponding to the marked second equipment.

3. In a switching system according to claim 2, wherein the said means for operating the first switch of any said switching means includes means for operating it in search of any idle second equipment, means in the last said switch for seizing any idle second equipment whose position is reached, and means rendering the said marking means responsive to said seizing means.

4. In combination, a pair of switches each having brushes and each having a contact bank comprising successive sets of contacts engageable by said brushes, each switch including a stepping magnet and circuit means for energizing and deenergizing it in succession to step the associated brush from one set of contacts to the next on each deenergization of the stepping magnet, equipments accessible to said switches, each through a separate set of contacts in the bank of each switch, means for operating the magnet of the first switch to cause such switch to find any idle equipment and to stop thereon, means responsive thereto for starting the second switch into operation by its stepping magnet and for making a marking connection to a contact in its corresponding contact set by way of a brush and engaged contact thereof of the first switch, and a circuit path through a brush of the second switch in series with said marking connection for shunting the stepping magnet upon the arrival of the second switch at the marked contact set, whereby the second switch is stopped at the marked position without overrun.

References Cited in the file of this patent

UNITED STATES PATENTS

| | | |
|---|---|---|
| 1,579,835 | Powell | Apr. 6, 1926 |
| 2,442,092 | McClew | May 25, 1948 |
| 2,444,065 | Pouliart | June 29, 1948 |